United States Patent
Annequin et al.

(10) Patent No.: US 10,868,385 B2
(45) Date of Patent: Dec. 15, 2020

(54) CONNECTOR HOUSING EQUIPPED WITH AN IMPROVED CONNECTOR POSITION ASSURANCE (CPA) DEVICE

(71) Applicant: RAYDIALL, Voiron (FR)

(72) Inventors: Sébastien Annequin, Voiron (FR); Rémi Duprez, Voiron (FR)

(73) Assignee: RAYDIALL, Voiron (FR)

( * ) Notice: Subject to any disclaimer, the term of this patent is extended or adjusted under 35 U.S.C. 154(b) by 0 days.

(21) Appl. No.: 16/420,618

(22) Filed: May 23, 2019

(65) Prior Publication Data

US 2020/0153148 A1 May 14, 2020

(30) Foreign Application Priority Data

Nov. 12, 2018 (FR) ..................... 18 60420

(51) Int. Cl.
| | |
|---|---|
| H01R 13/62 | (2006.01) |
| H01R 13/436 | (2006.01) |
| H01R 13/627 | (2006.01) |
| H01R 13/629 | (2006.01) |
| H01R 13/639 | (2006.01) |
| H01R 13/641 | (2006.01) |

(52) U.S. Cl.
CPC ....... *H01R 13/4365* (2013.01); *H01R 13/629* (2013.01); *H01R 13/6272* (2013.01); *H01R 13/639* (2013.01); *H01R 13/641* (2013.01)

(58) Field of Classification Search
CPC ............ H01R 13/4365; H01R 13/6272; H01R 13/629; H01R 13/639; H01R 13/641

USPC ........................................................ 439/595
See application file for complete search history.

(56) References Cited

U.S. PATENT DOCUMENTS

| | | | | |
|---|---|---|---|---|
| 6,250,943 | B1 * | 6/2001 | Castle ................ | H01R 13/6273 439/352 |
| 7,326,074 | B1 * | 2/2008 | Lim ..................... | H01R 13/629 439/352 |
| 7,785,146 | B2 * | 8/2010 | Chazottes .......... | H01R 13/4365 439/595 |
| 8,137,142 | B1 | 3/2012 | Dawson et al. | |
| 9,142,919 | B2 | 9/2015 | Osada et al. | |
| 9,160,095 | B2 | 10/2015 | Littek et al. | |
| 9,362,676 | B2 * | 6/2016 | Puhl .................... | H01R 13/6273 |
| 9,608,369 | B1 * | 3/2017 | Brandt ............... | H01R 13/6276 |
| 9,680,256 | B1 * | 6/2017 | Lane .................. | H01R 13/6275 |
| 9,742,115 | B2 * | 8/2017 | Matsumoto ........ | H01R 13/6272 |
| 9,762,002 | B1 * | 9/2017 | Matsumoto ........ | H01R 13/6271 |
| 9,929,509 | B1 * | 3/2018 | Penn .................... | H01R 13/641 |
| 10,038,278 | B2 * | 7/2018 | Lane .................. | H01R 13/6272 |

FOREIGN PATENT DOCUMENTS

| | | |
|---|---|---|
| WO | 2014/060229 A1 | 4/2014 |
| WO | 2017/158566 A1 | 9/2017 |

* cited by examiner

*Primary Examiner* — Abdullah A Riyami
*Assistant Examiner* — Vladimir Imas
(74) *Attorney, Agent, or Firm* — Pearne & Gordon LLP

(57) ABSTRACT

The present application relates to a connector housing whose device, called connector position assurance (CPA) device, installed so as to be able to slide inside the housing, is activated by the front end of the complementary connector housing that is not the lug, commonly called locking nose for locking the housings to one another.

10 Claims, 7 Drawing Sheets

[Fig 1]
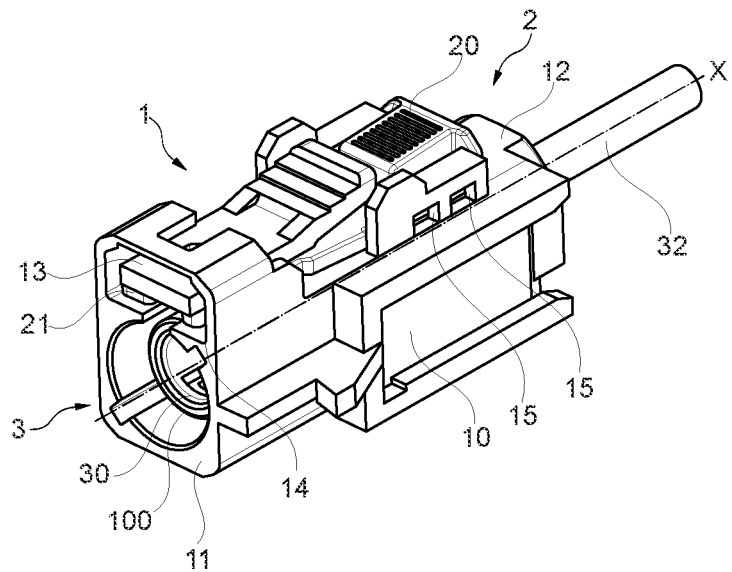
[Fig 2]
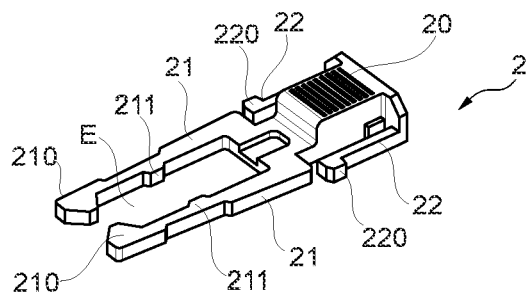
[Fig 3]
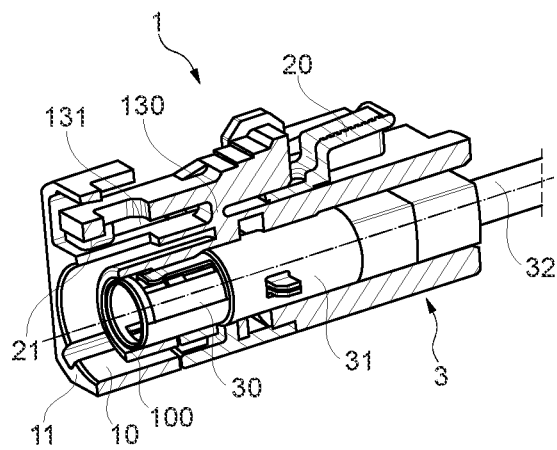
[Fig 3A]
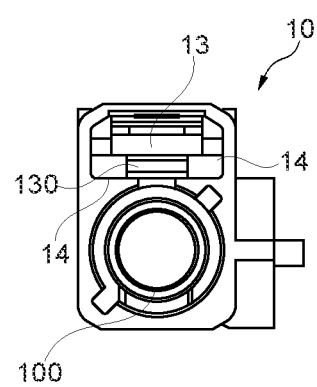

[Fig 3B]
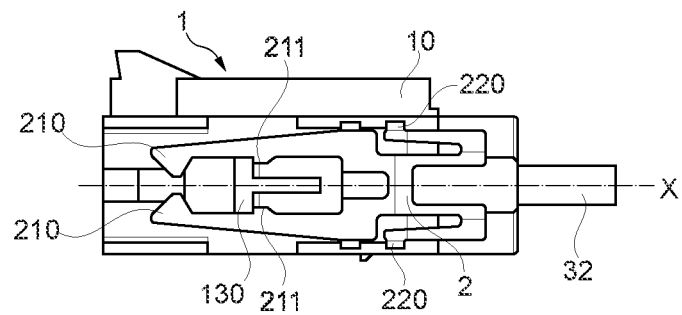
[Fig 4A]
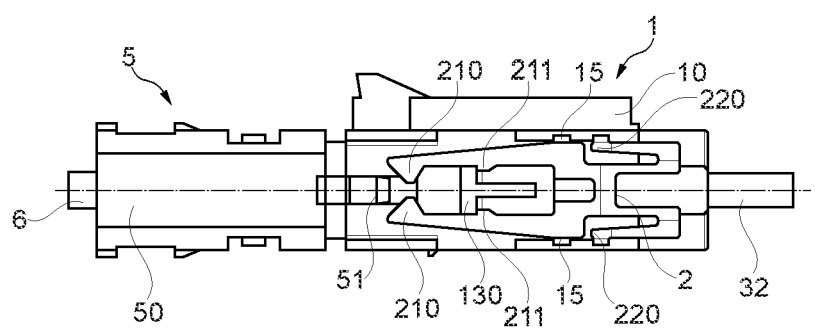
[Fig 4B]
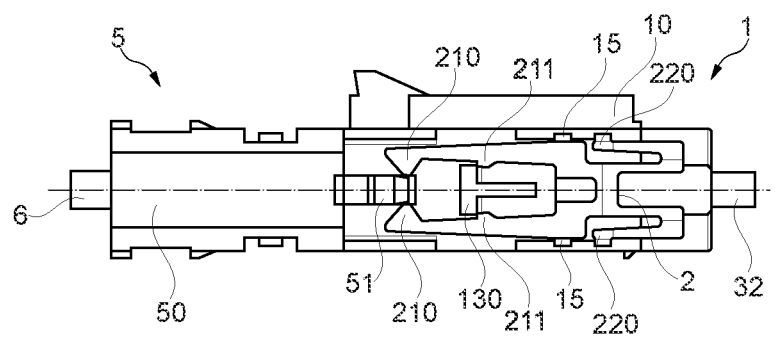

[Fig 4C]
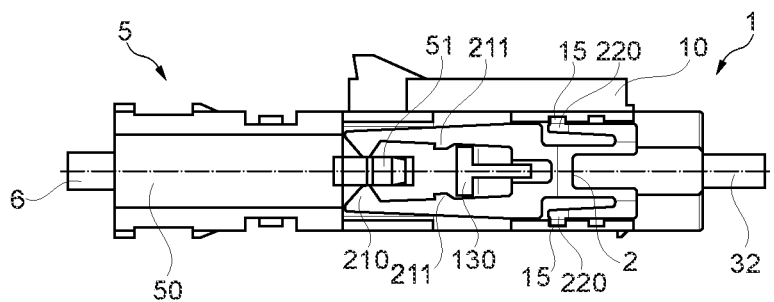
[Fig 5]
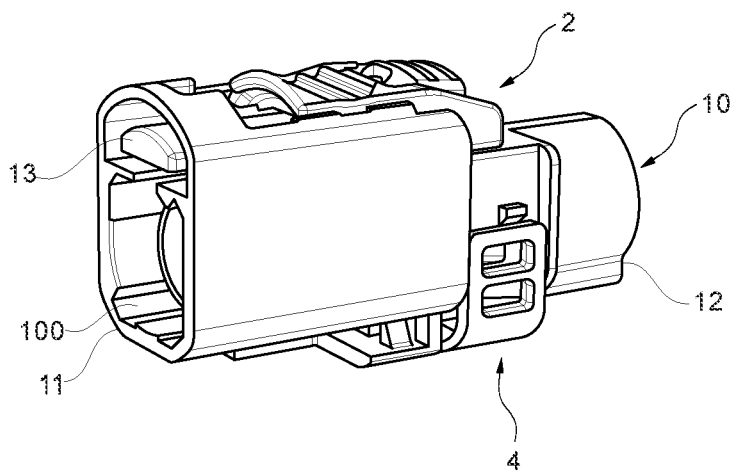
[Fig 6]
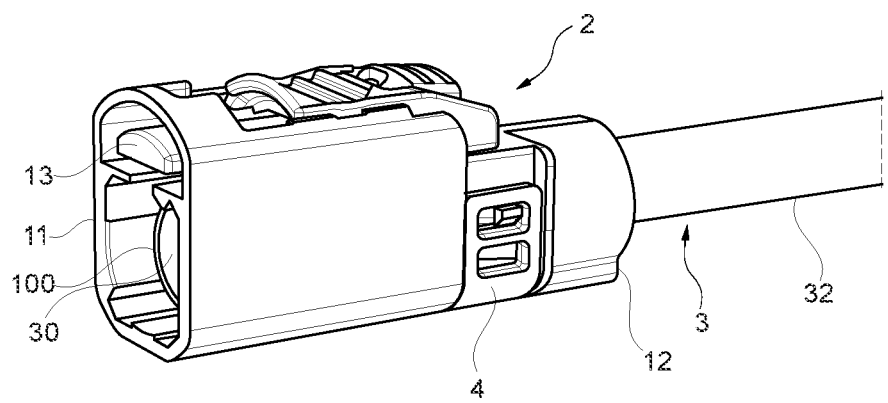

[Fig 7]
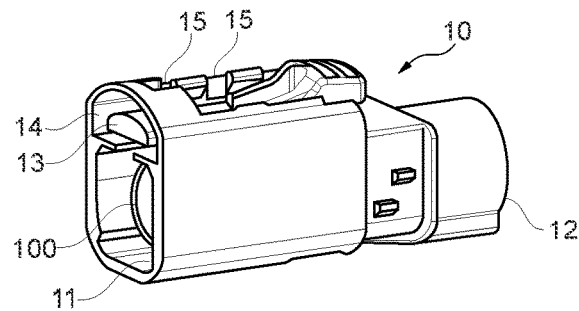
[Fig 8]
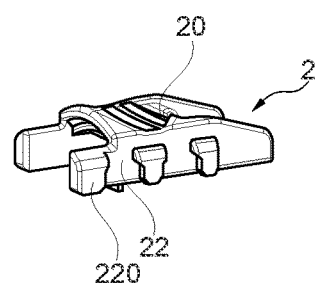
[Fig 7A]
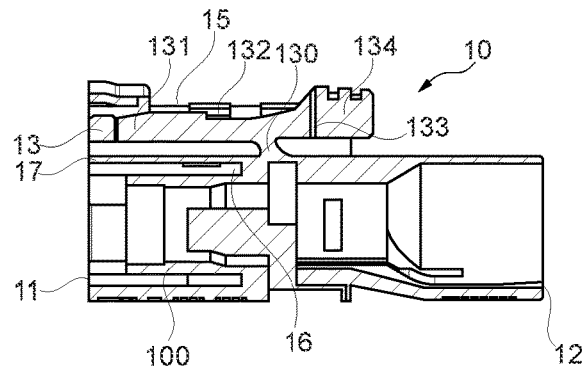
[Fig 8A]
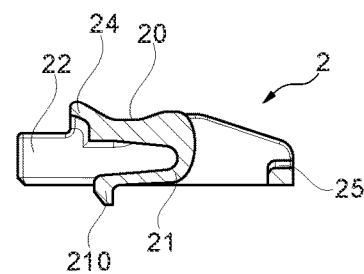
[Fig 7B]
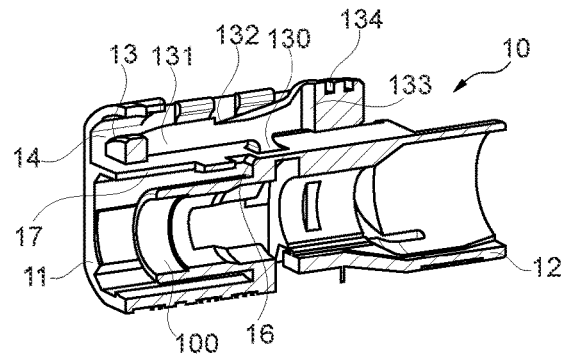
[Fig 8B]
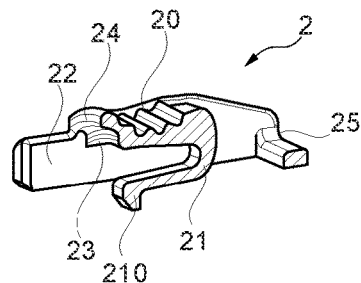

[Fig 9]
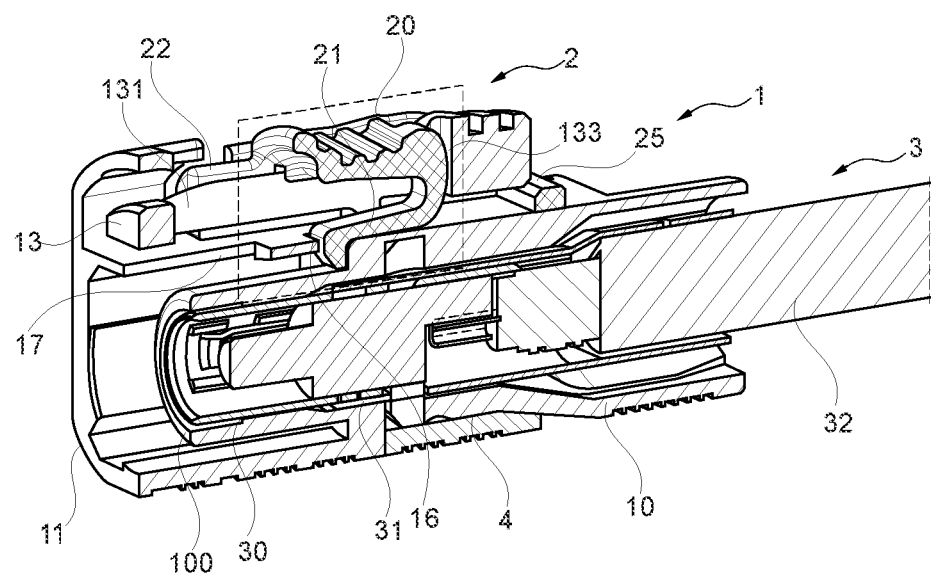
[Fig 9A]
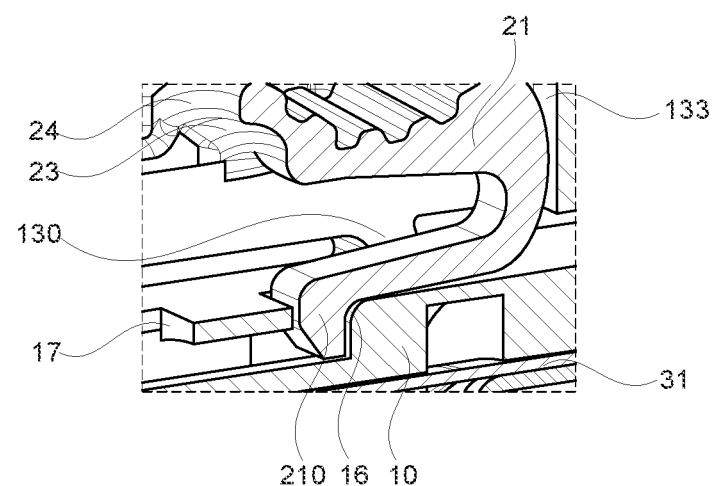

[Fig 10A]
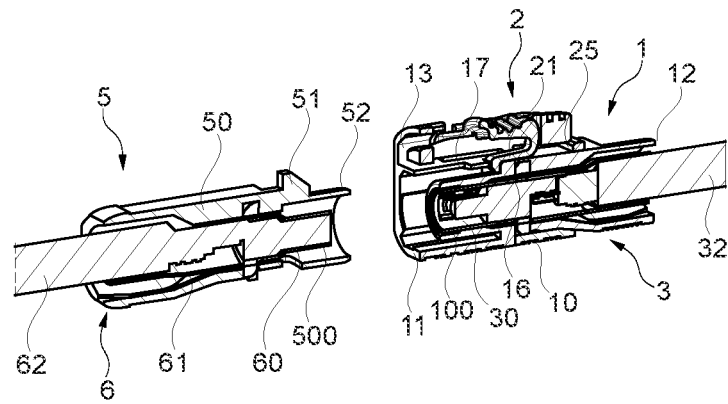
[Fig 10B]
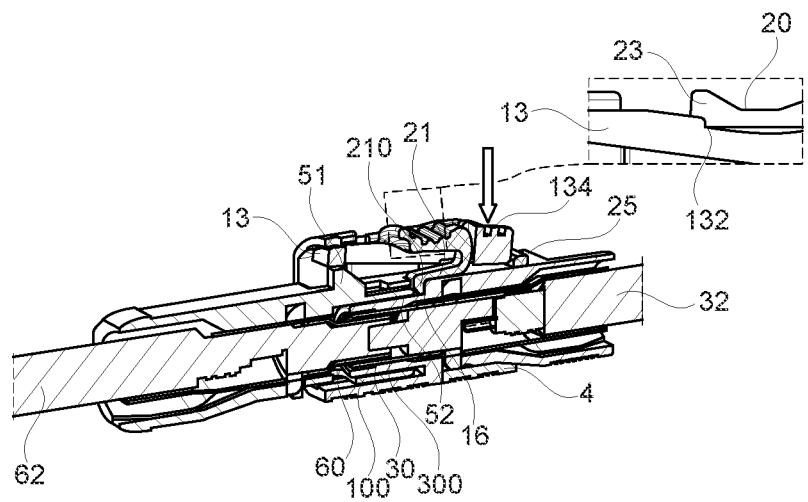
[Fig 10C]
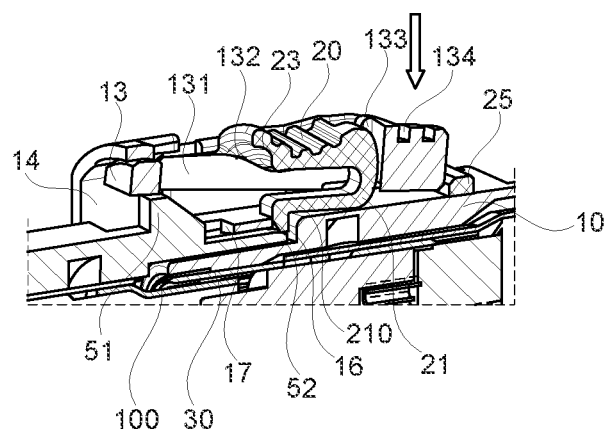

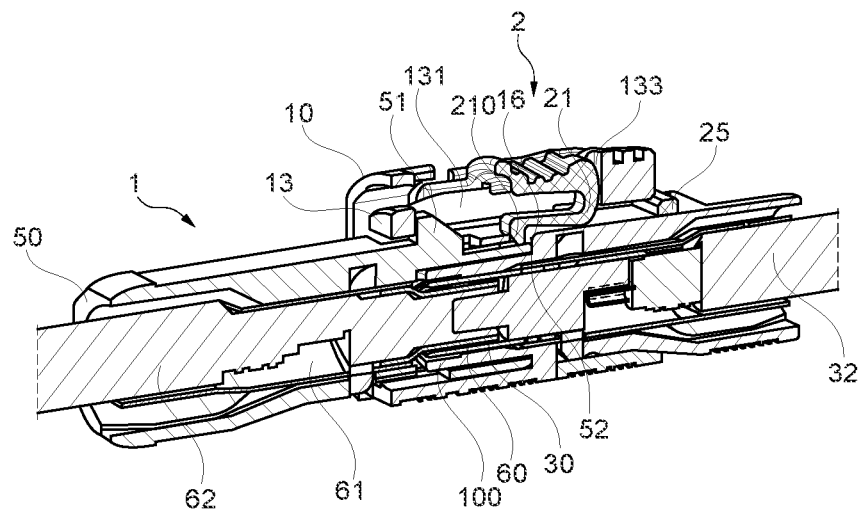
[Fig 10D]
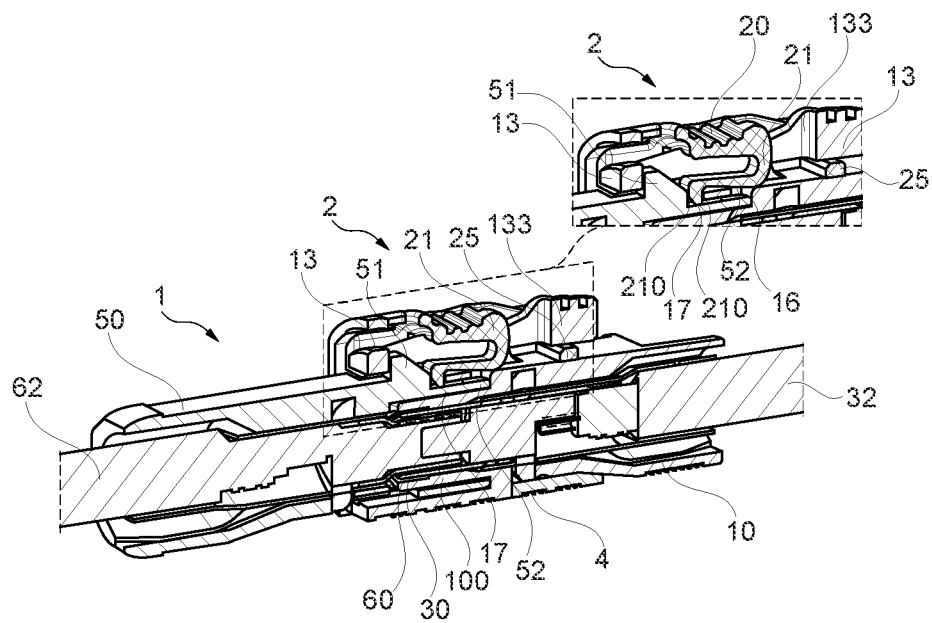
[Fig 10E]

CONNECTOR HOUSING EQUIPPED WITH AN IMPROVED CONNECTOR POSITION ASSURANCE (CPA) DEVICE

TECHNICAL FIELD

The present invention relates to connectors in the field of electrical and/or data transmission connector technology.

It relates more particularly to connector position assurance (CPA) devices.

The invention applies more generally to any type of connector technology for transmitting electrical signals and/or data and/or radiofrequency (RF) signals.

One advantageous application is connector technology for motor vehicles.

PRIOR ART

In the field of connector technology for transmitting electrical signals and/or data and/or radiofrequency (RF) signals, it is known that electrical, fiber-optic and other connections are made using two connectors that slot into one another, generally in the form of male and female connectors that are coupled to one another.

Each male or female connector includes electrical contacts, optical fibers or other conductors that are mutually situated and configured so as to provide a connection between one another when the male and female connectors are coupled to one another.

One general specification in the field of connectors is to ensure that, when two complementary connectors are coupled and locked to one another, they are not able to be inadvertently unlocked during installation or in use, so as to guarantee the electrical, optical or data connection. In particular, it is necessary to avoid the risk in which even though the complementary male and female connectors seem to be coupled, even visually, from the outside, they are in fact not so.

Such inadvertent decoupling during installation or in use, for example following impacts and/or vibrations, may lead to malfunctions due to the interruption of the signal or signals to be transmitted between the connectors. Plus, such decoupling, which may be identified visually as signifying correct coupling, may be even more difficult to identify in a technological product in which there may be a very large number of connections, such as for example in the field of motor vehicle connector technology.

To this end, it is known to equip one of the two complementary connectors with a connection position assurance (CPA in acronym form) device.

A CPA device is an element that is able to be moved relative to a connector housing that is equipped therewith, to an active position in which it secures locking, only when the connectors are mechanically coupled and locked to one another, but that is blocked in the housing in a position awaiting locking when the connectors are not mechanically coupled and locked to one another.

FIGS. 1 to 3A show one example of this type of currently existing connector 1 with a housing 10, of female type, equipped with a CPA device 2 and in which a cable termination 3 is housed and locked. This type of connector is also described in patent application WO2017/158566.

The conductor 30 of the terminal 3 is intended to be connected through coupling to a conductor of a complementary connector, not shown, through the front face 11 of the housing 10. The conductor 30 is held inside a drum 100 inside the connector housing 10.

The body 31 of the terminal 3 is locked inside the housing 10, and the cable 32 of the terminal emerges from the housing 10 through its rear face 12.

The housing 10 comprises a locking lever 13 molded to the housing. The lever 13 is mounted so as to pivot about a pivot 130 and is pierced with a through-aperture 131.

The CPA device 2, produced as a single part, is installed in the housing 10, between a position awaiting locking and an active locking securing position.

The CPA device 2 essentially comprises, at one of its ends, a head 20 with a manual pressing zone and, at the other of its ends, two first flexible tongues 21 linked to the head 20 and separated from one another by a clearance space E. The free end of each of these first tongues 21, which are preferably identical, is formed as a securing protrusion 210, facing toward the inside of the part 2. These flexible tongues 21 are designed so as to be housed in cavities 14 of the housing 10. Furthermore, the inside of each of these flexible tongues 21 is equipped with a blocking notch 211.

The CPA device 2 furthermore comprises projections 22 also linked to the head 20. The free end of each of these projections 22, which are preferably identical, is formed as a retaining protrusion or notches 220, facing toward the outside of the part 2. These retaining protrusions 220 are designed so as to snap into through-apertures 15 at the rear of the housing 10, so as to hold the CPA device 2 inside the housing 10.

A complementary male connector 5 that is intended to be coupled comprises a housing 50 inside which there is housed and held a cable terminal 6 complementary to the terminal 3 installed and housed in the housing 10.

The housing 50 comprises, on its outer periphery, a lug, commonly called locking nose 51, for locking the housings 10, 50 to one another.

In the position awaiting locking, the two blocking notches 211 prevent the CPA device 2 from moving toward the front of the housing 10 (FIG. 4A). Specifically, in this position, the two notches 211 are in contact on the pivot 130 of the housing 10.

When a complementary connector housing 50 is coupled to the housing 10, the lug or nose 51 provided for this purpose on the periphery of the complementary housing causes the pivoting lever 13 to raise, until the locking nose 51 snaps into the through-aperture 131, thereby bringing about locking of the coupling through snapping-in between the two complementary housings 10, 50. In this locking position, the lever 13 is lowered through pivoting thereof toward the housing 10.

At the same time as the raising of the pivoting lever 13, the locking nose of the complementary housing, by pressing with direct contact on the flexible tongues 21, exerts a deflection force toward the outside of the latter so as to allow the locking nose of the complementary housing to pass into the space E.

When the locking nose 51 of the housing 5 exerts a deflection force on the flexible tongues 21, these move apart from one another, thereby freeing the two blocking notches 211 from the pivot 130 (FIG. 4B). It is hence possible to move the CPA 2 into the housing 10, toward the front thereof.

During this movement, the retaining notches 220 of the CPA 2 are housed in the front apertures 15 of the housing 10 and block any pivoting of the tongue 13 (FIG. 4C). The retaining notches 220 thus guarantee a minimum force to be provided in order to unlock the two complementary housings 10, 50 from one another.

In other words, the active locking position of the projections 22 mechanically secures the locking created between the complementary housings that are coupled to one another.

The major drawback of a CPA device 2 as has just been described is linked to the fact that the activation, that is to say the deflection of the flexible tongues 21 so as to allow them to move from their position awaiting locking to their active locking securing position, is brought about by the direct pressing of the locking nose of the complementary housing.

Following on from this, this major drawback generates problems in terms of robustness of the locking lever 13. Specifically, directly activating the flexible tongues 21 through the locking nose of the complementary housing requires significant play in order to place and deflect the tongues 21. Due to this, as is visible in FIG. 3, the thickness of the pivot 130 is small, thereby limiting its mechanical strength and therefore possibly inducing breakage of the lever 13.

To the knowledge of the inventors, this major drawback is found in currently known CPA devices 2.

U.S. Pat. No. 9,142,919B2 discloses a solution with a CPA device that is fixed because it is in one piece with a female connector housing. When the male housing is coupled to the female housing, the locking nose of the male housing raises a flexible tongue for securing the locking of the CPA and allows the locking lever of the female housing and the male housing to retreat behind the flexible locking tongue, which is then in its active position.

Patent application WO2014/060229A1, just like U.S. Pat. No. 8,137,142B1, each describe a solution with a CPA device installed so as to be able to slide in a female connector housing. When the male housing is coupled to the female housing, the locking nose of the male housing raises a flexible tongue for securing the locking of the CPA, which is blocked in its active position against an inner wall of the female housing, above the locking lever.

U.S. Pat. No. 9,160,095B2 describes a solution with a CPA device held by a notch in a female connector housing, in its position awaiting locking. When the male housing is coupled to the female housing, the locking nose of the male housing presses on the notch, thereby making it possible to release the notch. The CPA device is then able to move in translation, so as to be inserted, into its active locking securing position, between the locking lever of the female housing and a protrusion internal to the female housing.

In addition to the abovementioned major drawback with the problems in terms of robustness of the locking levers, directly activating the CPA device through a locking nose requires complex housing shapes and a complex shape of the CPA device as such, which make it difficult to produce these parts.

To position the CPA from its active locking position to its position awaiting locking, and thus authorize unlocking of the connectors from one another, a simple manual push in order to push back the CPA is necessary.

There is therefore a need to improve locking securing solutions for connectors that are coupled and locked to one another by a CPA device, in particular in order to overcome the abovementioned major drawback and problems resulting therefrom.

The aim of the invention is to at least partly meet this need.

DISCLOSURE OF THE INVENTION

To this end, the invention relates to a connector housing, intended to be coupled to a complementary connector housing, the housing extending along a longitudinal axis and comprising:

a locking lever joined to the housing, the lever being able to pivot about a pivot transverse to the longitudinal axis, the lever being equipped with a through-aperture designed so as to interact through snapping-in with a locking lug of the complementary connector housing, so as to lock the connector housing and the one that is complementary, which are coupled, a device, called connector position assurance (CPA) device, installed so as to be able to slide inside the housing between a position awaiting locking and an active position in which it secures locking between the connector housing and the one that is complementary, the CPA device comprising at least one tongue configured so as respectively to be:
  blocked inside a first recess of the housing in the waiting position, such that it prevents any locking before the housing is coupled to the complementary housing,
  released from its waiting position, by virtue of pressing with an end part, separate from the lug, of the complementary connector housing, when the latter is inserted,
  blocked inside a second recess of the housing in the active securing position, such that it provides an unlocking force between the housing and the complementary housing.

The locking lever may be molded to the housing.

According to one advantageous variant embodiment, the tongue is designed, when it is blocked in its waiting position, so as not to be able to slide into its active securing position if the housing is not coupled to the complementary housing.

Preferably, the end part of the complementary housing that releases the tongue of the CPA device is the end of the recess of an electrical cable terminal housed and held in the complementary housing.

In other words, the invention consists in defining a connector whose CPA installed so as to be able to slide inside the housing is activated by the front end of the complementary connector housing that is not the lug, commonly called locking nose for locking the housings to one another.

Thus, by drawing a clear distinction between the elements that have to perform locking functions between complementary connector housings, and then of securing this locking, this makes it possible not to have the same dimensional constraints for the housings, and in particular for the installation play of the CPA inside one of the housings and for dimensions of the locking lever.

The robustness of all of the locking and CPA components is thus guaranteed, in particular that of the pivot of the locking lever, which is a source of mechanical weakness in the solutions according to the prior art.

Furthermore, the solution according to the invention makes it possible to prevent any activation of the CPA if no complementary housing is coupled to the housing equipped with the CPA.

Also, the connector according to the invention may be connected to a conventional standardized complementary connector.

According to one advantageous variant, the second recess is designed such that the locking lug is pinched between the protrusion, housed in said recess in its active securing position, and the lever.

According to one advantageous embodiment:
the lever comprises at least one holding notch;
the CPA device comprises at least one holding notch designed so as to interact with the holding notch of the lever when the latter is in a pivoted position during the coupling between housings, so as to keep the CPA device blocked in translation.

The CPA device preferably comprises at least one stop surface designed so as to be housed below the lever, so as to block the pivoting of the lever in the active position of the CPA device.

Again preferably, the CPA device comprises at least one stop surface designed so as to block the CPA device against the housing, in the active position of the CPA device.

The invention also relates to a connector comprising:
a connector housing equipped with a CPA device such as described above;
an electrical cable terminal, housed and installed in the housing.

According to one advantageous embodiment, the connector comprises a device, called terminal position assurance (TPA) device, which holds the terminal in the connector.

The invention also relates, according to another of its aspects, to a method for securely locking and coupling a connector such as described above to a complementary connector, comprising the following steps:
a/coupling the connector housings, with insertion of one into the other,
b/mutually locking the connectors by way of the locking lug snapped into the through-aperture of the lever;
c/moving the CPA device which has moved out of its waiting position through an end part of the housing, in translation until it reaches its active locking securing position in which it is housed in the recess of the housing.

DETAILED DESCRIPTION

Other advantages and features of the invention will become more clearly apparent upon reading the detailed description of exemplary implementations of the invention, given by way of nonlimiting illustration, and with reference to the following figures, in which:

FIG. 1 is a perspective view of an exemplary connector whose housing is equipped with a CPA device according to the prior art;

FIG. 2 is a perspective view of the CPA device according to the prior art fitted to the housing of FIG. 1;

FIG. 3 is a perspective and partial longitudinal sectional view of the connector according to FIG. 1;

FIG. 3A is a cross-sectional view of a connector housing according to the prior art as illustrated in FIGS. 1 and 3;

FIG. 3B is a longitudinal sectional view of a connector housing according to the prior art as illustrated in FIGS. 1 and 3;

FIGS. 4A to 4C are partial longitudinal sectional views showing the various steps of coupling and locking two complementary connectors according to the prior art, and of activating a CPA device according to the prior art;

FIG. 5 is a perspective view of a housing equipped with a CPA device according to the invention;

FIG. 6 is a perspective view of a connector with a housing equipped with its CPA device according to FIG. 4 and in which a cable termination is installed and held;

FIGS. 7, 7A and 7B are perspective, longitudinal sectional and longitudinal sectional perspective views, respectively, of a connector housing according to the invention before the installation of its CPA device;

FIGS. 8, 8A and 8B are perspective, longitudinal sectional and longitudinal sectional perspective views, respectively, of a CPA device before its installation in a connector housing according to FIGS. 7 to 7B;

FIGS. 9 and 9A are a longitudinal sectional perspective view and a detailed view, respectively, of a connector according to the invention as illustrated in FIG. 5;

FIGS. 10A to 10E are perspective views showing the various steps of coupling and locking a connector according to the invention to a complementary connector, and of activating a CPA device according to the invention.

FIGS. 1 to 4C in relation to a connector with a housing equipped with a CPA device according to the prior art have been described in the preamble. They will therefore not be discussed below.

For the sake of clarity, one and the same structural element of a connector according to the prior art and according to the invention is denoted using the same reference number.

It is specified here that, throughout the present application, the terms "lower", "upper", "above", "below", "inside", "outside", "inner" and "outer" are to be understood with reference to a connector according to the invention in a substantially horizontal configuration.

As illustrated in FIGS. 5 and 6, a female connector 1 according to the invention comprises a housing 10 in which a CPA device 2 is installed so as to be able to slide and which houses an electrical and/or data cable terminal 3 that is held by way of another removable device 4, called "terminal position assurance" (TPA). The TPA is not obligatory.

The TPA device 4 is described and claimed in the patent application entitled "Connector housing equipped with an improved cable terminal position assurance (TPA) device", filed in the name of the applicant on the same day as the present application.

The conductor 30 of the terminal 3 is intended to be connected through coupling to a conductor 60 of a complementary connector 6, through the front face 11 of the housing 10. The conductor 30 is held inside a drum 100 inside the connector housing 10.

The body 31 of the terminal 3 is locked inside the housing 10, and the cable 32 of the terminal emerges from the housing 10 through its rear face 12.

As illustrated in FIGS. 7 to 7B, the housing 10 comprises a locking lever 13 molded to the housing. The lever 13 is mounted so as to pivot about a pivot 130 and is pierced with a through-aperture 131.

The locking lever 13 furthermore comprises:
on its outer periphery, at least one holding notch 132 designed so as to hold the CPA device 2 in a position, as explained hereinafter;
an inner stop surface 133 designed so as to block the CPA device 2 in its waiting position;
an outer pressing surface 134 designed so as to allow manual pressing so as to pivot the lever about its pivot 130.

The housing 10 also comprises, in its inner part above the drum 100, a first through-recess 16 designed so as to block the CPA device 2 in its waiting position, and a second through-recess 17 designed so as to block the CPA device 2 in its active position.

The CPA device 2, produced as a single part, is installed in the housing 10, between a position awaiting locking and an active locking securing position, as explained hereinafter.

The CPA device 2 essentially comprises, at one of its ends, a head 20 with a manual pressing zone and, at the other of its ends, projections 22 linked to the head 20. The free end of each of these projections 22, which are preferably identical, is formed as a retaining protrusion 220, facing toward the outside of the part 2. These retaining protrusions 220 are designed so as to snap into clearances 15 in the housing 10, so as to hold the CPA device 2 inside the housing 10 regardless of its position of awaiting locking or active locking.

A flexible tongue 21 linked to the head 20 projects toward the outside. The free end of this tongue 21 is formed as a securing protrusion 210, facing toward the outside of the part 2. This flexible tongue 21 is designed so as to be housed in one and then the other of the recesses 16, 17 of the housing 10, depending on the position, respectively waiting or active, of the CPA 2.

The CPA device 2 furthermore comprises a notch 23 designed so as to interact with the notch 132 of the locking lever 13 when the latter is pivoted.

The CPA device 2 lastly comprises two stop surfaces 24, 25, respectively at the front and at the rear, which are designed so as to abut respectively against the housing 10 and below the locking lever 13 so as to avoid any unwanted lifting of the device 2 into its active securing position. Furthermore, the retaining lugs 220 slide underneath suitable elevations of the housing, and thus prevent lifting of the CPA 2.

FIGS. 9 and 9A illustrate a connector 1 according to the invention with its housing 10, in which a cable terminal 3 is housed and held and in which the CPA device 2 is assembled in its position awaiting locking.

In this position awaiting locking, the CPA device 2 is blocked firstly by the protrusion 210 of the tongue 21 housed in the recess 16, and secondly with the rear surface of the tongue 21 abutting against the inner stop surface 133 of the pivoting lever 13.

A description is now given, with reference to FIGS. 10A to 10E, of the various steps of connection with locking of a female connector 1 according to the invention with a complementary male connector 5 and securing of the locking by the CPA device 2.

Beforehand, the complementary male connector 5 comprises a housing 50 inside which there is housed and held a cable terminal 6 complementary to the terminal 3 installed and housed in the housing 10.

The conductor 60 of the terminal 6 is thus intended to be connected through coupling to the conductor 30, through the front face 11 of the housing 10. The conductor 60 is held inside a drum 500 inside the connector housing 50.

The body 61 of the terminal 6 is locked inside the housing 10, and the cable 62 of the terminal emerges from the housing 50 through its rear face.

The housing 50 also comprises, on its outer periphery, a locking nose 51 for locking the housings 10, 50 to one another.

Step a/: The two connectors 1, 5 are coupled by placing them facing one another and by moving them in translation toward one another so as to insert one of them inside the other, as symbolized by the black arrow in FIG. 10A. In this phase of approaching for the purpose of coupling, the lever 13 is not pivoted and the CPA device 2 is in the position awaiting locking.

Step b/: Introducing the connector 5 into the complementary connector 1 leads to the locking nose 51 being brought into abutment against the bottom of the locking lever 13, thereby making the latter pivot about its pivot 130 (FIG. 10B). In this phase, the holding notch 132 presses against the notch 23 of the CPA device, thereby making it possible to block the latter, that is to say to prevent any undesired translation thereof (FIG. 10B).

Step c/: By continuing to insert the conductor 5 into the complementary connector 1, the end 52 of the housing 50 raises the protrusion 210 of the tongue 21, thereby making it possible to partially clear the latter from the recess 16 (FIG. 10C). In this phase, the lever 13 is still raised and the interaction between the holding notches 23, 132 continues to block the CPA device 2 in translation (FIG. 10C).

Step d/: Once the locking nose 51 has snapped into the through-aperture 131 of the lever 13, the latter is returned to its initial non-pivoted position, and locking is achieved (FIG. 10D). In this position, the notch 23 of the CPA device 2 is freed from the notch 132 of the lever 13, thereby making it possible to release the CPA device 2 in translation, since the end 52 of the housing 50 has completely cleared the protrusion 210 from the recess 16 (FIG. 10D).

Step e/: The method then ends by moving the CPA device 2 in translation by manually pressing on the surface 20 provided for this purpose. The translation in the direction of the black arrow in FIG. 9E makes it possible to bring the protrusion 210 into the recess 17 (FIG. 10E).

The CPA device 2 is thus blocked in its active locking securing position. Specifically, the locking nose 51 is pinched firstly by the lever 13 and the protrusion 210 that is itself housed and held in the recess 17.

In this active position, the stop 25 of the CPA device 2 is housed below the lever 13, thereby preventing the latter from pivoting, and therefore making it possible to avoid unwanted unlocking (FIG. 10E). In this active position as well, the CPA device 2 is in mechanical abutment, through its stop surface 24, against the housing 10 (FIG. 10E).

It is enough to apply a sufficient tractive force from the CPA 2 toward the rear of the connector 1 (in the opposite direction from the arrow of FIG. 10E) in order to unlock the coupling of the connectors: the lug 210 is cleared from the recess 17, the stop 25 is then able to retreat and free the stop 133 in order to pivot the locking lever 13 and remove the complementary connector.

Other variants and advantages of the invention may be realized without however departing from the scope of the invention.

Thus, although in all of the illustrated embodiments the housing that is equipped with a CPA device according to the invention is a female housing, it is entirely possible to contemplate this being a male housing.

The invention is not limited to the examples that have just been described; it is possible in particular to combine features of the examples illustrated with one another in variants that are not illustrated.

What is claimed is:

1. A connector housing, intended to be coupled to a complementary connector housing, the housing extending along a longitudinal axis (X) and comprising:
   a locking lever joined to the housing, the lever being able to pivot about a pivot transverse to the longitudinal axis (X), the lever being equipped with a through-aperture designed so as to interact through snapping-in with a locking lug of the complementary connector housing, so as to lock the connector housing and the one that is complementary, which are coupled;
   a device, called a connector position assurance (CPA) device, installed so as to be able to slide inside the housing between a waiting position and an active securing position in which the CPA device secures locking between the connector housing and the one that is complementary, the CPA device comprising at least one tongue, the free end of said at least one tongue being shaped as a securing protuberance configured so as respectively to be:
      blocked inside a first recess of the housing in the waiting position, released from the waiting position, by virtue of pressing with an end part, separate from the locking lug, of the complementary connector housing, when the latter is inserted, blocked inside a second recess of the housing in the active securing position, such that the at least one tongue provides an unlocking force between the housing and the complementary housing.

2. The connector housing as claimed in claim 1, wherein the locking lever is molded to the housing.

3. The connector housing as claimed in claim 1, wherein the at least one tongue is designed, when the at least one tongue is blocked in the waiting position, so as not to be able to slide into the active securing position if the housing is not coupled to the complementary housing.

4. The connector housing as claimed in claim 1, wherein the at least one tongue comprising a protrusion and the second recess is designed such that the locking lug is pinched between the protrusion, housed in said recess in the active securing position, and the lever.

5. The connector housing as claimed in claim 1, wherein:
the lever comprises at least one holding notch;
the CPA device comprises at least one holding notch designed so as to interact with the holding notch of the lever when the latter is in a pivoted position during the coupling between housings, so as to keep the CPA device blocked in translation.

6. The connector housing as claimed in claim 1, wherein the CPA device comprises at least one stop surface designed so as to be housed below the lever, so as to block the pivoting of the lever in the active position of the CPA device.

7. The connector housing as claimed in claim 1, wherein the CPA device comprises at least one stop surface designed so as to block the CPA device against the housing, in the active position of the CPA device.

8. A connector comprising:
a connector housing equipped with a CPA device as claimed in claim 1;
an electrical cable terminal, housed and installed in the housing.

9. The connector as claimed in claim 8, comprising a device, called terminal position assurance (TPA) device, which holds the terminal in the connector.

10. A method for securely locking and coupling a connector as claimed in claim 8 to a complementary connector, comprising the following steps:
a/coupling the connector housings, with insertion of one into the other;
b/mutually locking the connectors by way of the locking lug snapped into the through-aperture of the lever;
c/moving the CPA device which has moved out of the waiting position through an end part of the housing, in translation until the CPA device reaches the active locking securing position in which the at least one tongue is housed in the recess of the housing.

\* \* \* \* \*